(12) United States Patent
Crossland et al.

(10) Patent No.: US 6,654,156 B1
(45) Date of Patent: Nov. 25, 2003

(54) IMAGE DISPLAY SYSTEM

(75) Inventors: William Alden Crossland, Cambridge (GB); Timothy Martin Coker, Perterborough (GB)

(73) Assignee: Holographic Imaging LLC, Birmingham, MI (US)

( * ) Notice: Subject to any disclaimer, the term of this patent is extended or adjusted under 35 U.S.C. 154(b) by 0 days.

(21) Appl. No.: 09/856,309

(22) PCT Filed: Dec. 23, 1999

(86) PCT No.: PCT/GB99/04407

§ 371 (c)(1),
(2), (4) Date: May 21, 2001

(87) PCT Pub. No.: WO00/40018

PCT Pub. Date: Jul. 6, 2000

(30) Foreign Application Priority Data

Dec. 23, 1998 (GB) ............................................... 9828287

(51) Int. Cl.⁷ ........................... G02B 26/00; G02F 1/03; G02F 1/1335; G03B 21/00; H04N 1/29
(52) U.S. Cl. ................ 359/290; 359/245; 359/298; 359/238; 359/259; 359/618; 359/619; 353/31; 353/34; 349/5; 349/17; 348/751; 348/757; 358/300; 324/754
(58) Field of Search ................ 359/290, 291, 359/295, 298, 245, 618, 619, 621; 348/757, 751, 383; 353/30, 31, 34, 37; 349/17, 5, 7, 20; 324/754, 73.1

(56) References Cited

U.S. PATENT DOCUMENTS

| | | | | |
|---|---|---|---|---|
| 4,229,095 A | * | 10/1980 | Mir | 358/300 |
| 5,177,437 A | | 1/1993 | Henley | 324/754 |
| 5,475,513 A | | 12/1995 | Nakanishi et al. | 349/5 |
| 5,555,035 A | | 9/1996 | Mead et al. | 348/757 |
| 5,587,829 A | * | 12/1996 | Alexander et al. | 359/298 |
| 6,016,224 A | * | 1/2000 | Namiki | 359/619 |
| 6,348,990 B1 | * | 2/2002 | Igasaki et al. | 359/259 |

FOREIGN PATENT DOCUMENTS

| | | |
|---|---|---|
| EP | 0 803 759 | 10/1997 |
| GB | 2 330 471 | 4/1999 |
| JP | 7-72503 | 3/1995 |
| JP | 9-113928 | 5/1997 |

OTHER PUBLICATIONS

Patent Abstracts of Japan vol. 1996, No. 10, Oct. 1996, & JP08 160448 A (Sharp Corp), Jun. 1996.

* cited by examiner

Primary Examiner—Loha Ben
(74) Attorney, Agent, or Firm—Nixon & Vanderhye P.C.

(57) ABSTRACT

An image display system, e.g. for projection type displays, has an electrically addressed spatial light modulator or EASLM (1) and an optically addressed spatial light modulator or OASLM (5). An image formed on the EASLM (1) is transferred to a part of the OASLM (5) by an image transfer means (3) and the image produced by the OASLM (5) is formed from a plurality of successive images formed by the EASLM.

16 Claims, 4 Drawing Sheets

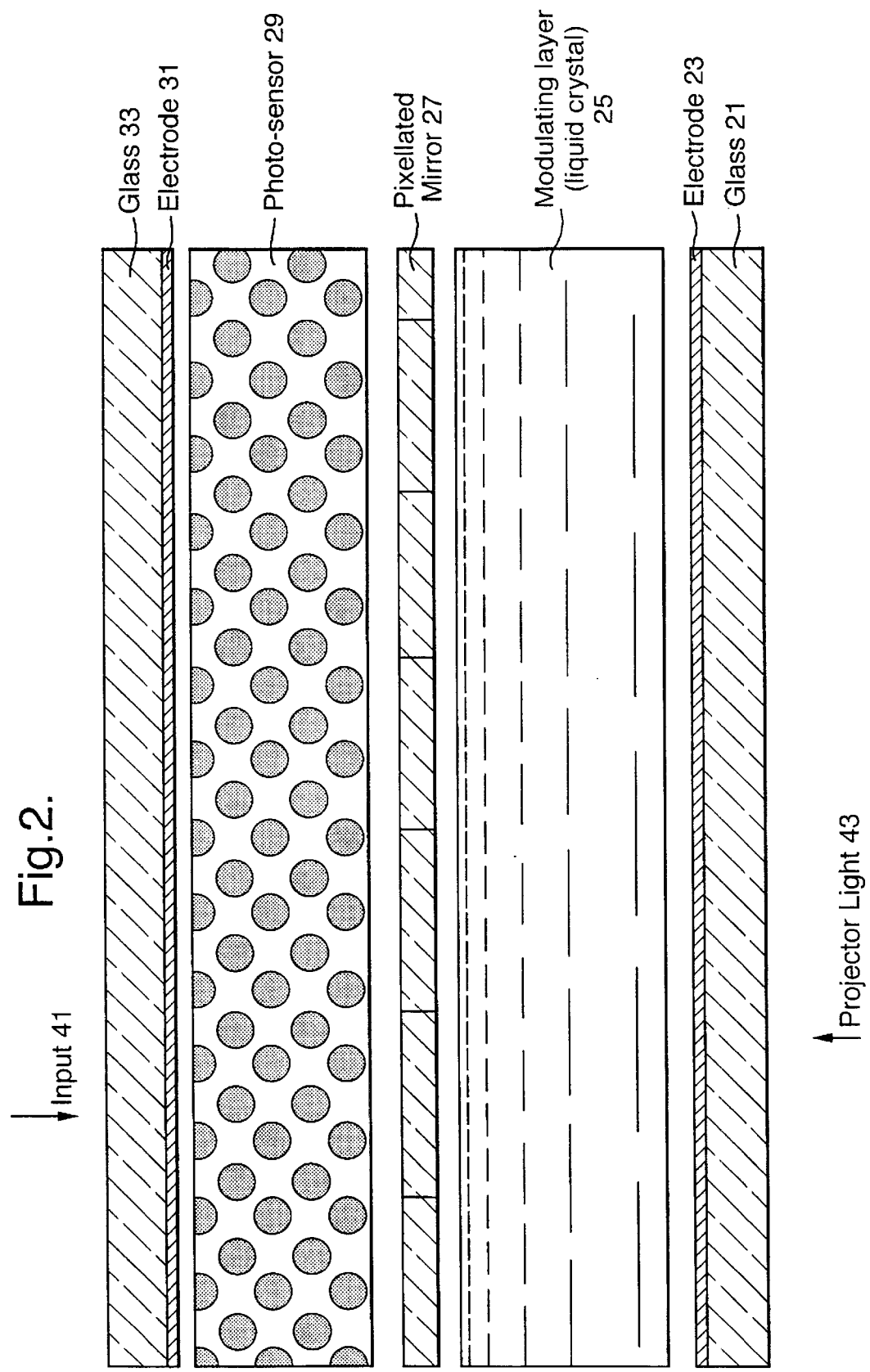

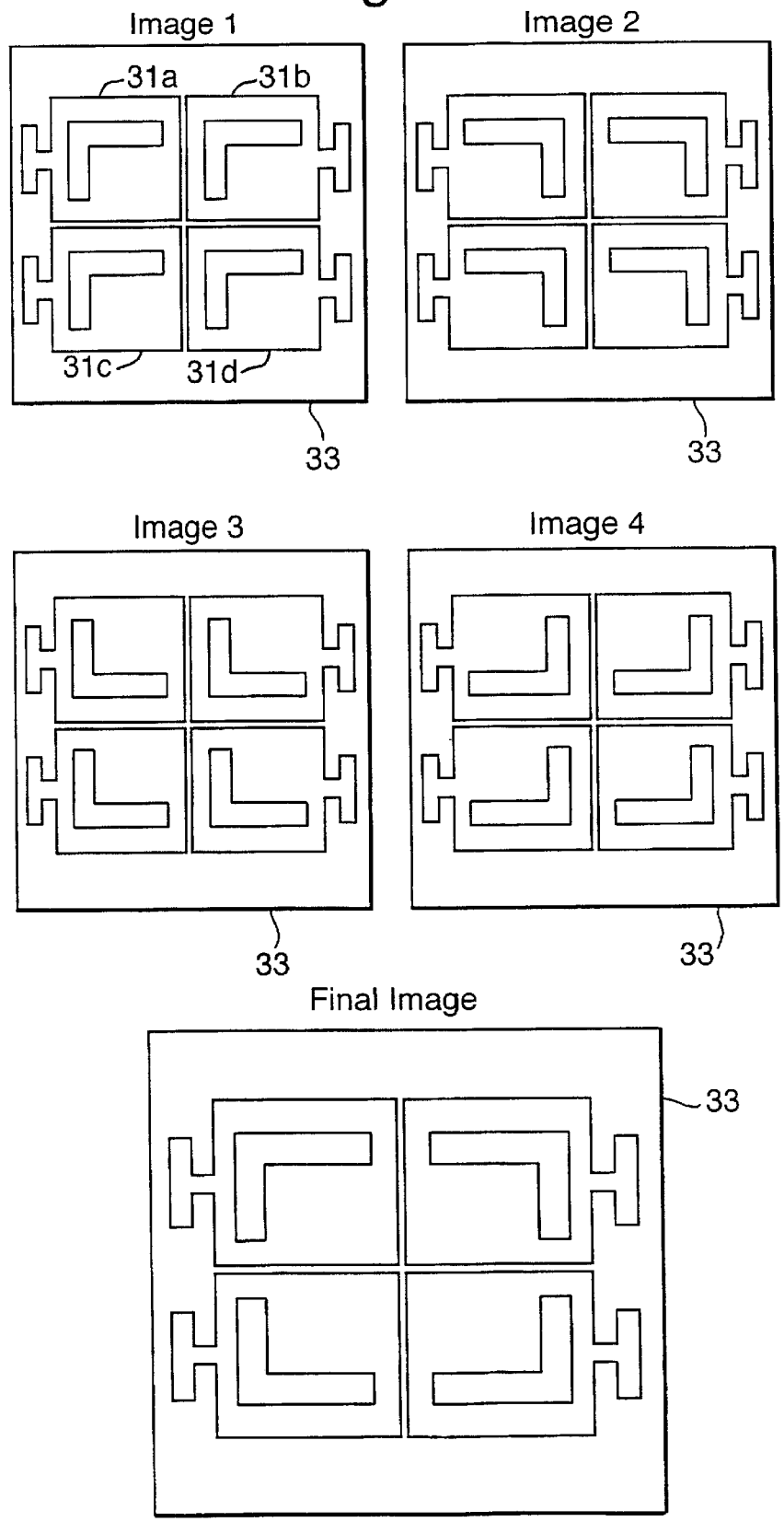

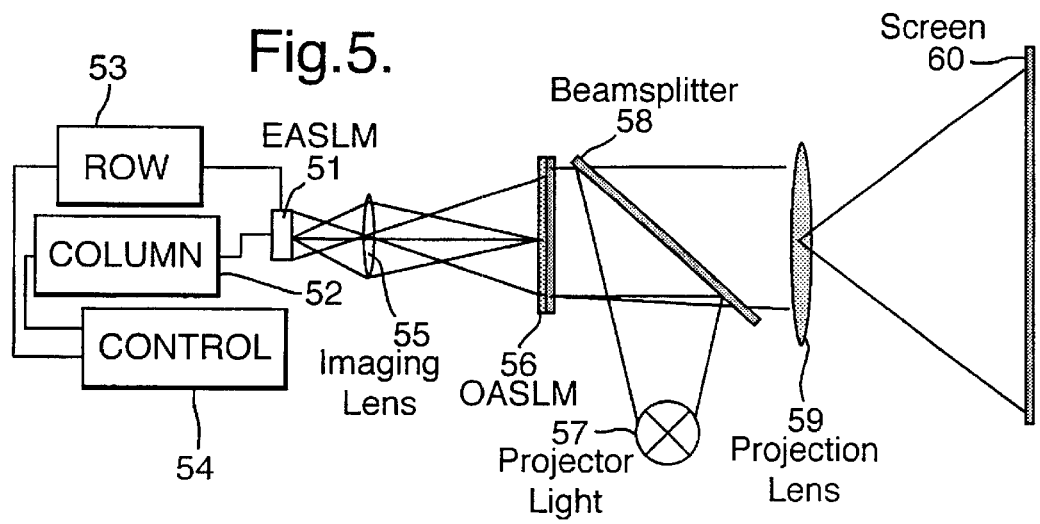
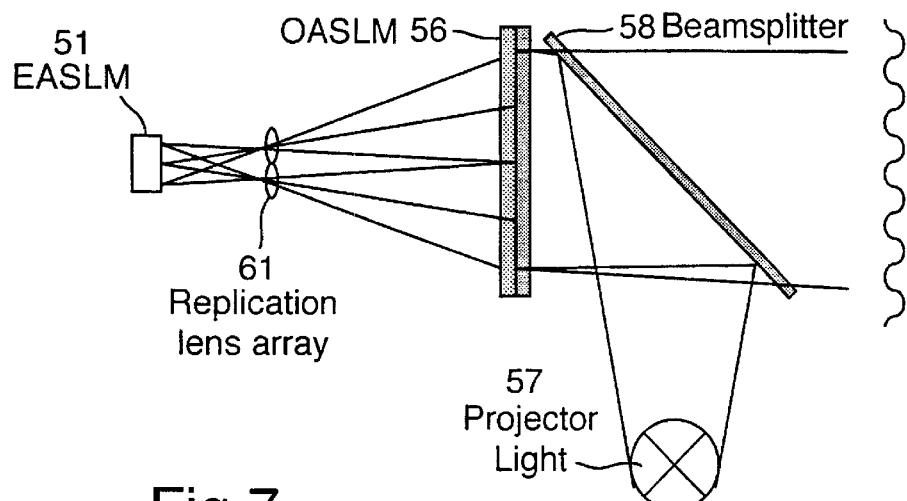
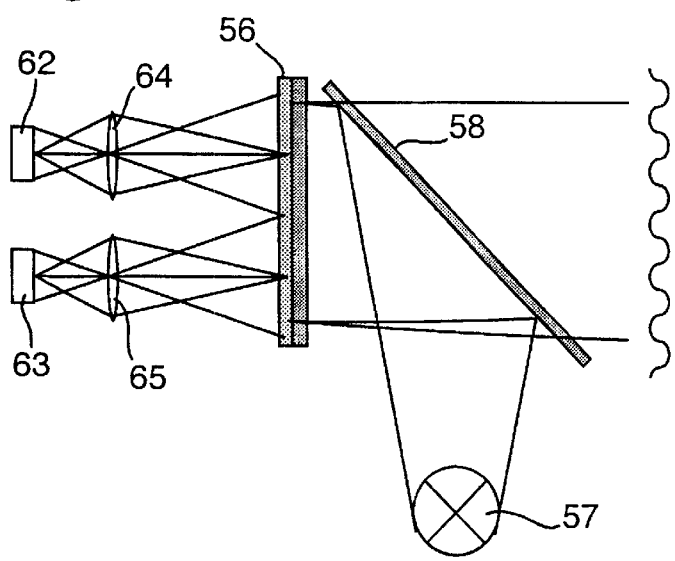

IMAGE DISPLAY SYSTEM

This application is the US national phase of International Application No. PCT/GB99/04407, filed Dec. 23, 1999, the entire content of which is hereby incorporated by reference.

Projection displays, eg for lecture theatres, often use electrically addressed Spatial Light Modulators (EASLM). A Spatial Light Modulator is a device that spatially rather than temporally modulates one or more components of an otherwise uniform beam of light; an EASLM can be defined as a spatial light modulator whose elements are connected to and addressed by an electrical circuit.

EASLM technology for projection displays is maturing quickly and there are various products on the market already; these are currently based on two different technologies:

Transparent TFT SLMs;

Digital Micromirror Device (DMD). See for example J M Younse, Projection Display Systems based on the Digital-Micromirror Device, Proceedings of the SPIE, Vol 2641, 1995.

Projection displays that use relatively large TFT-type EASLMs have been available for some time. However, they have all the disadvantages of this type of technology (expense, speed, fill factor etc). These disadvantages can be overcome by the use of VLSI silicon backplane based EASLMs which offer major improvements in the quality of the integrated circuitry and costs of manufacture. The DMD-based projection display is an example of such a system; however, this technology, although available, is still new and untried and there are doubts regarding its true costs.

A third type of display is possible using ferro-electric liquid crystals (FELC) over VLSI silicon backplanes; apart from cost and the type of modulation, the FELC technology is very similar to the DMD technology. However, there are also problems with this approach, some shared with the DMD technology-principally that very large image sizes and resolutions are difficult and expensive to achieve. For a description of this technology see, for example, N Collings et al; "Evolutionary Developments of Advanced Liquid Crystal Spatial Light Modulators" (Applied Optics Vol 28, No 22, Nov. 15, 1989) and references therein.

According to the present invention there is provided an image generating device comprising an electrically addressable spatial light modulator means capable of forming an image and an optically addressable spatial slight modulator means for producing an image and image transfer means for relaying the image from the electrically addressable spatial light modulator means to the optically addressable spatial light modulator means wherein the image produced by the optically addressable spatial light modulator means is formed from a plurality of successive images formed by the electrically addressable spatial light modulator means.

An Optically Addressable Spatial Light Modulator (OASLM) is a spatial light modulator each of whose elements is optically non-linear in such a way that illumination by one ray of light will influence the action of the element on a second ray of light. Because it is addressed optically it can include a highly planar reflective surface for projection applications. The EASLM will generally be pixellated, for instance an array of liquid crystal elements, addressed by suitable, eg orthogonal, electrodes or circuitry. Using the EASLM merely as a pixel generator and producing the final image from an OASLM, which forms a high quality optical front end, has various advantages:

Comparatively simple and cheap techniques can be used to make OASLMs;

The size and optical quality of an OASLM is greater than that possible for all but prohibitively expensive EASLMs (an OASLM need have no topography underlying the pixels and can use very high quality cold-deposited mirrors); moreover protection displays require an image of larger area than is economically feasible with active-backplane EASLMs;

Additional processing of the image can be done by the transfer optics (see below); and High intensity illumination of the EASLM is avoided.

The EASLM device also need only operate with monochromatic light, even for a frame sequential colour display system. The performance of the EASLM and the optical transfer means can therefore be optimised for this wavelength of operation, permitting the exploitation of low cost diffractive and holographic optical components.

For a description of OASLMs see below and also D Williams et al, "An Amorphous Silicon/Chiral Smectic Spatial Light Modulator", Joint of Physics D, Vol 21, 1988.

As an EASLM can be operated at addressing rates in excess of what would be required for image display the EASLM can be used at a high addressing rate to generate subsequent parts of final image to be produced on the OASLM. Each successive image produced by the EASLM may be written to a separate part of the OASLM which is driven at a suitable addressing rate for display. This allows an increase in the resolution of the display system without needing an increase in the size of the EASLM.

The image from the EASLM may be imaged sequentially on different parts of the OASLM in order to build up the final image. The image transfer means may supply an image from the EASLM to one or more parts of the OASLM at any one time. The image transfer means could comprise beam steering apparatus to steer the image to the desired part of the OASLM. The beam steering apparatus could be any suitable apparatus for moving the image to the desired part of the OASLM as would be readily appreciated by one skilled in the art. Alternatively the EASLM and image transfer means could comprise an array of transfer means for relaying the image to different parts of the OASLM, each transfer means in the array having a means for preventing the image being transferred to that part of the OASLM when not required.

In a preferred embodiment the image from the EASLM is simultaneously imaged onto a plurality of different parts of the OASLM and only part of the OASLM is addressed to receive an image. This has the advantage of allowing simple and fixed image transfer means, such as an array of lenses, to relay the image from the EASLM to the OASLM. As only part of the OASLM is addressed however only that part of the OASLM will receive that image. When the next, image is displayed on the EASLM this new image will again be imaged a plurality of times on the OASLM. A different part of the OASLM will be addressed however and thus this part receives the image from the EASLM.

In a further preferred embodiment the OASLM will have an ability to store or retain the image segments across the device until the complete image has been written. This may be achieved using charge trapping in the photosensor, display modes with intrinsic memory or transient response times within the OASLM such as will be readily understood by one skilled in the art. The higher complexity image can then be read out with without image decay problems. The data held on the OASLM may then be erased and new data written or the old data may be repeatedly readout.

Preferably the EASLM incorporates an active backplane and thus includes an array of crystalline silicon transistors addressing a liquid crystal layer so as to produce the EASLM image, and the OASLM is a layer of liquid crystal and a layer of photo-sensor sandwiched between a pair of transparent conductors. In order to decouple the modulating light incident on the OASLM from the output light a mirror layer can be included between the liquid crystal and photo-sensor layers. This may formed by a pixelated metal layer or a multi-layer Bragg reflector type mirror. The inclusion of light blocking layers within the OASLM device may also be advantageous to the system performance.

Advantageously the image transfer means may be adapted to process the image from the EASLM. The transfer means may thus include between the EASLM and OASLM an optical information processor; this processor may be for example a hologram, such as an etched glass plate, as is known. The use of a hologram allows a multiplication of the size and of the resolution of the image. The circuitry that is present in practice to co-ordinate the EASLM and the OASLM so that the image projected onto the OASLM is spatially (de-)multiplexed may then also control the optical information processor.

In the rather simpler case where incoherent light is used the image transfer means can be simply a lens system transferring the EASLM image, preferably with magnification, to the OASLM. Further extension in resolution enhancement can also be achieved by using multiple EASLMs.

Preferably the image display system is a colour display system wherein the EASLM operates with monochromatic light. By having the image from the EASLM monochromatic the image transfer means can be relatively simple. Colour display may be achieved by producing sequential images from the OASLM in synchronisation with passing the image formed on the OASLM through a particular colour filter.

For a better understanding of the invention embodiments of it will now be described, by way of example, with reference to the accompanying drawings, in which:

FIG. 2 shows a detail of part of the apparatus;

FIG. 4 illustrates the operation of the device of FIG. 3;

FIG. 5 shows a projection system with magnification of an EASLM onto an OASLM with projection of the EASLM from a high brightness projector light;

FIG. 6 is a modification of FIG. 5 using a refractive array to provide multiple images from the EASLM onto the OASLM; and FIG. 7 is a further modification of FIG. 5 showing multiple EASLM imaged onto the OASLM.

Figure 1:
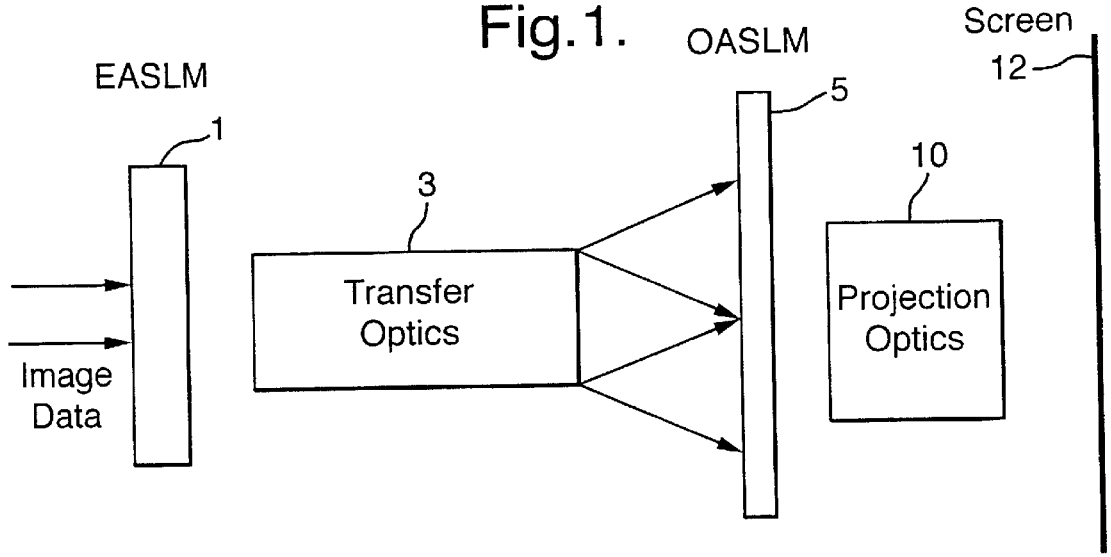
FIG. 1 shows a block diagram of a system representing an application of the invention to a projection display.

FIG. 1 shows very schematically the entire apparatus for a projection display, consisting of an EASLM 1 which generates the image data, transfer optics 3 which process the image if required and apply it to the OASLM 5, and the projection optics 10 which reflect a bright source of light off the OASLM onto a screen 12.

The EASLM is the image generator, that is, it converts the (electronic) image data into an actual image. Since the final image is not actually being projected off the EASLM, pure optical quality is not of paramount importance. This is advantageous because, although it is possible to raise the optical quality of the EASLM to high levels, extra processing is required and overall yield is reduced, thus increasing the unit cost of the EASLM. In this example the EASLM itself uses semi-conductor ("active") backplane technology with liquid crystals as the optical modulator.

In the case of incoherent optics the magnification on to the OASLM could be achieved by a simple lens system; all that is required is a factor of 2 or thereabouts, since this increases the area of the image from about a 1-cm square, which is the largest size of silicon chip that can conveniently be fabricated, to about a 2-cm square, which is comparable to standard 35 mm film. The size of the silicon display element in conventional displays is a significant constraint as large silicon devices are expensive, but small devices result in low projector efficiency. This increase in size of the image to be projected enables the efficiency of the projector optics to be increased without increasing the cost of the silicon display element.

Likewise using incoherent optics it would also be possible in principle to make use of image replication, by using a combination of beam splitters or prisms. However, in one preferred embodiment of the invention the light from the EASLM is coherent and holographic beam replication and magnification is employed. When coherent light is used, and the transfer optics 3 comprise suitable lenses and a CGH representing a phase grating, the image from the EASLM is reproduced in a lattice of copies on the OASLM.

The optical modulator, ie the EASLM, will most likely be binary. However, various analogue (grey-scale) effects are possible even with binary modulators. Furthermore the EASLM may be of the emissive type (eg VCSEL arrays or other emissive technologies) rather than reflective or transmissive. (VCSEL=Vertical-Cavity Surface-Emitting Laser). These devices may also be binary or analogue. In addition, the EASLM technology is not specific for this application and can produce greyscale images through any of the known techniques, including greyscale modulation, spatial and temporal dither.

The transfer optics 3 play an important role in this system. They may be coherent or incoherent, though coherent optics allow a number of processing techniques to be applied, such as:

Image replication by use of computer-generated holograms (CGH) (see Dames et al, "Efficient Optical Elements to Generate Intensity Weighted Spot Arrays", Applied Optics, Vol 30, No 19, Jul. 1, 1991). In this way the image projected off the OASLM can be arbitrarily related to the image generated by the EASLM although in practice simple 2×2 or 3×3 replication arrays would be most likely;

Spatial filtering, edge enhancement etc;

Optical correlation; and

Image magnification (in addition to or in place of image replication). This would also be possible with incoherent optics.

In addition the transfer optics could transfer images off multiple EASLMs into the same OASLM, so as to give a larger image than can be achieved with a single EASLM.

The OASLM 5 will in most practical applications be an electro-optic device, with liquid crystals as the optical modulator. Such a device is shown schematically in FIG. 2. Here a liquid crystal modulating layer 25 and a photosensor (eg amorphous silicon) or photoconductor layer 29 are sandwiched together between glass substrates 21, 33 respectively, carrying transparent electrodes 23, 31 made conventionally of ITO and having an applied voltage.

In use the input of "write" beam 41 of light is directed normally at the upper side, ie the photosensor side, of the OASLM, passing through the upper substrate 33 and entering the photoconductor.

Meanwhile the "read" beam 43 is input from below in the diagram. Where the write beam 41 strikes the photosensor 29 the latter becomes conductive, the conductive area then acting as an electrode for the liquid crystal layer 25 at that point. That part of the liquid crystal then modulates the read beam 43 as it passes through the LC and is reflected at the interface with the photosensor.

The OASLM in the preferred version shown further includes a pixellated mirror 27 between the photosensor 29 and the LC 25, because this enables a high optical power to be projected off such a device. This layer will completely shield the photosensor from the high intensity read light; thus this type of OASLM is a true light valve in that the "write" light and "read" light are separated.

The pixellation or subdivision of the mirror is necessary to prevent the image from being "shorted" out. The final pixellation of that image will be defined by the pixellation of the OASLM and not that of the EASLM. Thus the quality of the EASLM image is of little importance (to the quality of the final projected image) provided that it is of sufficient quality to write the image onto the OASLM. Moreover, in principle the EASLM pixellation need bear no relation to the OASLM pixellation. However, it may be sensible to arrange a one-to-one relation between EASLM and OASLM pixels.

Figure 3:
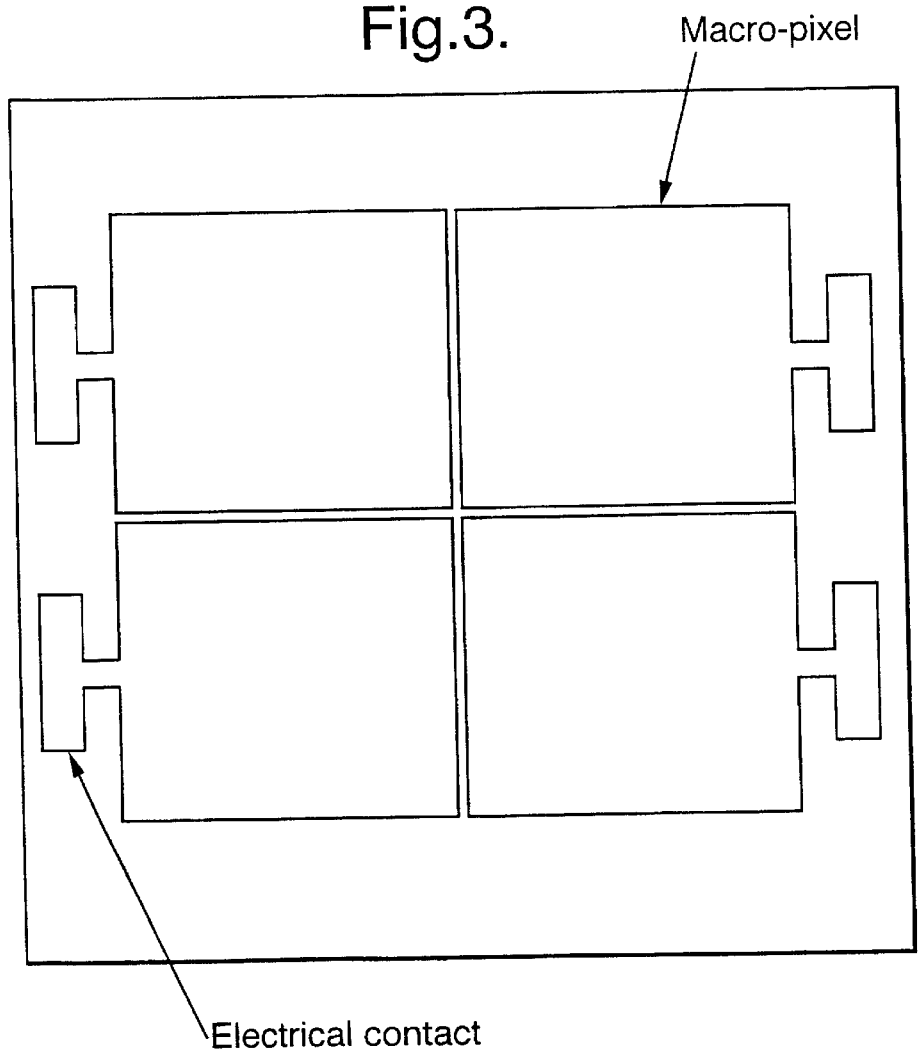
FIG. 3 shows a plan view of one version of the apparatus.

The OASLM may also be a binary or analogue modulator. In the case of a binary device image grey scales could be formed by the use of standard temporal or spatial dither techniques. Where image replication is used in the transfer optics it will be necessary to pattern the transparent conductor 23 or 31 on at least one side of the OASLM in such a way that the areas of the OASLM that are addressed by each replicated image from the EASLM(s) are electrically isolated from each other. This process defines large "micropixels", each macro-pixel corresponding to a replicated EASLM image, as shown in FIG. 3, the operation of the macropixels being shown in FIG. 4. Thus in Image 1 only the electrode area 31a is turned on, in the next frame, Image 2, only electrode area 31b, and so forth; the final image is then composed of the four quadrants as shown in the Final Image.

The advantages of the OASLM are principally twofold:

Quality—high optical quality OASLMs are cheaper than similar quality EASLMs; and Image size in conjunction with the transfer optics the image that is projected off the OASLM can be made much larger than that which is possible from an EASLM. This in turn means that a projection display based on this system will have greater optical efficiency than a system that projects directly off a VLSI silicon-backplane EASLM.

The projection optics 10 can be standard, other than that the image formed is reflective rather than transparent. Alternatively the optics could use a beam splitter of the Glan-Thompson type together with a normal projection lens. The final image formation technique will ,most likely be frame-sequential colour as this saves devices and makes the optics much simpler and more accurate (there are no colour convergence problems). However the use of multiple devices and colour channels is also possible. Colour generation could be by rotating colour wheel, solid-state colour shutter or a colour separation scheme using dichroic mirrors.

It will be apparent that the invention can be applied to such systems as:

Simple projection displays for home, auditorium or lecture theatre,

Rear-screen projection displays,

Large-screen/high-definition TV,

Auto-stereoscopic displays; and even

Optically transparent telecomms switching.

In this application the word "image" is used to denote not only a visible image but any modulated light pattern, including a phase pattern. Thus although a prime application of the invention is projection optics, it can be applied to many other image processing requirements, for instance NxN fibre switches. A 4×4 switch would work in this manner: a CGH would be displayed on the OASLM in the same way asian image frame, using 2×2 replication; thus each quadrant will display a different switching (or beam steering) hologram; if each of the four input fibres is directed against one quadrant, the four input beams can be diffracted in different directions so as to be separately directed to four different output fibres; thus 4×4 switching is achieved.

Embodiments of the invention can provide large numbers of pattern repeats. CGHs for beam steering and other applications generally consist of a large number of repeats of a single pixel pattern (a unit cell). Within a single EASLM image a certain number of repeats can be accommodated. However by use of the image replication techniques within the transfer optics of this system, the number of repeats of the unit cell can be greatly increased, leading to greater efficiency. For example:

| | |
|---|---|
| Unit Cell of the hologram | 16 × 16 pixels; |
| EASLM | 256 × 256 pixels, so that the unit cell is repeated 16 times in each direction; |
| Transfer Optics | 3 × 3 replication; hence: |
| OASLM hologram | 48 repeats in each direction. |

These multiple copies can be used, for instance, in a projection display to increase the number of pixels, ie the resolution, of the OASLM image for a given resolution on the EASLM.

As shown in FIG. 5 an EASLM 51 is addressed by column 52 and row 53 drivers under the control of a control unit 54. In this case the EASLM 51 has an x,y matrix of separately addressable pixels. For a monochrome display all pixels may be similar, but may be of different dimensions so that a'spatial grey scale display is provided using different groups of differently sized pixels. Alternatively the pixels may be in groups of three, each group having a red, a green, and a blue dye pixel.

The EASLM 51 may be a transmissive or reflective device whose output is imaged by imaging lens 55 onto a larger size OASLM 56. As in previous examples the OASLM has an x,y matrix of separate pixels corresponding to one or one group of pixels on the EASLM. Light output from the EASLM switches liquid crystal material in the OASLM. A display on the OASLM 56 is collectively formed by each pixel being in one of two states, e.g. reflective or absorbing. Alternatively, for grey scale displays, each pixel may be in a different level of absorption.

A high power projection light 57 is reflected by a beam-splitter 58 onto the front face of the OASLM, then selectively reflected back through a projection lens 59 onto a screen 60 for viewing by observers.

A projected displays is observed when the EASLM 51 causes images to be generated and directed onto the OASLM 56 where an enlarged display is formed. This is made visible on the screen 60 by the projector 57 light being selectively reflected off the OASLM 56. For monochrome displays, the display may be a static display, e.g. of text, or a video type display of frame sequential images. This may be extended to colour displays by frame sequential projection of three different monochrome images onto the screen in synchronism with switching of a red, green and blue colour filter between the OASLM and beamsplitter. The three different colour images must be above a flicker threshold (about 30 frame per second) so an observer will receive a multicolour image. Alternatively, if the EASLM has its pixels formed into a coloured display, then the colours may be projected straight to the OASLM and thence to the screen 60.

FIG. 6 shows a replication lens array 61 arranged to provide multiple images of the EASLM 51 onto the OASLM 56. Otherwise the system is the same as that of FIG. 5.

FIG. 7 shows an array of EASLMs 62 63 each imaged onto the OASLM 56. As shown each EASLM 62 63 has associated therewith one imaging lens 64 65, but could have an array as in FIG. 6. The use of multiple EASLMs allows use of different frame rates for the EASLM 51 and the OASLM 56.

Groups of pixels on the OASLM receive electric voltages so that different areas display information time sequentially. This allows use of very high speed images from the EASLM being time multiplexed onto different areas of the OASLM and thence to the screen. The result may be a multiplication of apparent number of pixels on the OASLM. Again, this may be monochrome or colour. If the frame rate is sufficiently high, moving video images may be displayed. Even higher rate imaging may be used to display holographic images provided by the control unit 54 taking holographic images from a memory store.

Displays using combinations of EASLMs and OASLMs are described in patent applications PCT/GB 98/03097 and PCT/GB 98/01866.

What is claimed is:

1. An image generating device comprising;
   an electrically addressable spatial light modulator for forming a plurality of successive images;
   an optically addressable spatial light modulator for producing an image; and
   an image transfer apparatus for relaying the images from the electrically addressable spatial light modulator to the optically addressable spatial light modulator,
   wherein the image produced by the optically addressable spatial light modulator is formed from the plurality of successive images formed by the electrically addressable spatial light modulator.

2. An image generating device as claimed in claim 1, wherein the image transfer apparatus relays an image from the electrically addressable spatial light modulator to a part of the optically addressable spatial light modulators.

3. An image generating device as claimed in claim 1, wherein the image transfer apparatus comprises a beam steering, apparatus for steering the image to the desired part of the optically addressable spatial light modulator.

4. An image generating device as claimed in claim 1, wherein the electrically addressable spatial light modulator and image transfer apparatus comprise an array of transfer means for relaying the image to different parts of the optically addressable spatial light modulator, each transfer means in the array includes means for preventing the image being transferred to that part of the optically addressable spatial light modulator when not required.

5. An image generating device as claimed in claim 1, wherein the electrically addressable spatial light modulator is simultaneously imaged onto a plurality of different parts of the optically addressable spatial light modulator and only part of the optically addressable spatial light modulator is addressed to receive an image.

6. An image generating device as claimed in claim 1, wherein the optically addressable spatial light modulator is adapted so as to be able to retain an image written to a part of the optically addressable spatial light modulator.

7. An image generating device as claimed in claim 1, wherein the electrically addressable spatial light modulator incorporates an active backplane.

8. An image generating device as claimed in claim 1, wherein the optically addressable spatial light modulator comprises a layer of liquid crystal and a layer of photo-sensor sandwiched between a pair of transparent conductors.

9. An image generating device as claimed in claim 8, wherein the optically addressable spatial light modulator further comprises a mirror layer between the liquid crystal and photo-sensor layers.

10. An image generating device as claimed in claim 1, wherein the image transfer apparatus comprises an optical information processor.

11. An image generating device as claimed in claim 10, wherein the optical information processor is a hologram.

12. An image generating device as claimed in claim 1, wherein the electrically addressable spatial light modulator comprises an array of electrically addressable spatial light modulators.

13. An image generating device as claimed in claim 1, wherein the device is a projection system and includes a projector light for illuminating the optically addressable spatial light modulator with light that can be reflected off the optically addressable spatial light modulator and onto a screen for displaying of an enlarged image.

14. An image generating device as claimed in claim 1, wherein the image produced by the electrically addressable spatial light modulator is monochrome.

15. An optical switch comprising:
    an electrically addressable spatial light modulator for forming a plurality of successive images;
    an optically addressable spatial slight modulator for producing a computer generated hologram from said plurality of successive images;
    image transfer means for relaying the plurality of successive images from the electrically addressable spatial light modulator to the optically addressable spatial light modulator, and
    an optical waveguide, responsive to said optically addressable spatial light modulator, for transmitting the computer generated hologram.

16. An image generating device comprising:
    an electrically addressable spatial light modulator for forming a plurality of successive images;
    an optically addressable spatial slight modulator for producing an image from said plurality of successive images;
    image transfer apparatus for relaying the plurality of successive images from the electrically addressable spatial light modulator to the optically addressable spatial light modulator; and
    a projector for projecting the image from the optically addressable spatial light modulator onto a surface, from which the image from the optically addressable spatial light modulator is viewed.

* * * * *